UNITED STATES PATENT OFFICE.

KURT HESS, OF LEVERKUSEN, NEAR COLOGNE, GERMANY, ASSIGNOR TO SYNTHETIC PATENTS CO., INC., OF NEW YORK, N. Y., A CORPORATION OF NEW YORK.

N-ALKYLATED IMINOKETONES.

1,158,496.  Specification of Letters Patent.  Patented Nov. 2, 1915.

No Drawing.  Application filed October 6, 1914.  Serial No. 865,300.

*To all whom it may concern:*

Be it known that I, KURT HESS, doctor of philosophy, chemist, citizen of the German Empire, residing at Leverkusen, near Cologne, Germany, have invented new and useful Improvements in N-Alkylated Iminoketones, of which the following is a specification.

I have found that new and valuable products can be obtained from organic substances containing an oxidizable group and containing nitrogen linked together with hydrogen replaceable by an alkyl, such as a heterocyclic imino alcohol containing an exocyclic carbinol group, by heating them with an aldehyde *e. g.* formic aldehyde or benzaldehyde. By this operation oxidation and alkylation takes place at the same time, the parent material being converted into an aminoketone. The new products are generally oils of an alkaline reaction generally soluble in water, alcohol and ether; yielding crystalline picrates and oxims.

In order to illustrate the new process more fully the following example is given, the parts being by weight: 560 parts of alpha-pyrrolidylpropan-(-1-)ol having most probably the formula:

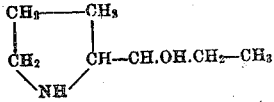

are dissolved in 1000 parts of water. Concentrated hydrochloric acid is added to acidulate the solution and the liquid is heated during 4 hours to 115°–120° C. in a closed vessel together with 500 parts of a 40 per cent. solution of formic aldehyde. The resulting product being alpha-n-methylpyrrolidylpropan-(1)-on (*i. e.* n-methyl-alpha-ethylcarbonyl-tetra-methyleneimin), and having most probably the formula:

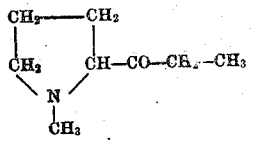

is precipitated by the addition of alkali and dissolved by shaking the mixture with ether. It is an oil of a disagreeable basic odor easily soluble in water and the usual organic solvents. It boils at 70°–75° C. under a pressure of 12 mm. Its picrate melts at 103° C. From the isomeric alpha-pyrrolidylpropan-(-2-)ol having most probably the formula:

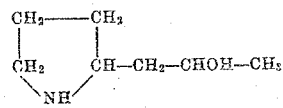

an oil having most probably the formula:

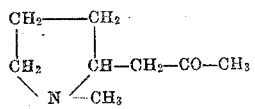

results boiling at 79°–83° C. under a pressure of 14 mm. Its picrate melts at 174° C., the oxim at 125° C.

The above described new products are members of a class of substances which may be generically termed tertiary heterocyclic iminoketones containing an exocyclic keto group, *i. e.* the keto group being attached directly to an atom of the ring.

I claim:—

1. The herein described new tertiary heterocyclic iminoketones containing an exocyclic keto group, being generally oils of an alkaline reaction generally soluble in water, alcohol and ether; yielding crystalline picrates and oxims, substantially as described.

2. The herein described new n-alkyl-c-alkylcarbonyl-polymethyleneimins being generally oils of an alkaline reaction generally soluble in water, alcohol, and ether; yielding crystalline picrates and oxims, substantially as described.

3. The herein described new n-methyl-c-alkylcarbonyl-polymethyleneimins being generally oils of an alkaline reaction generally soluble in water, alcohol and ether; yielding crystalline picrates and oxims, substantially as described.

4. The herein described new n-alkyl-c-ethylcarbonyl-polymethyleneimins being generally oils of an alkaline reaction generally soluble in water, alcohol and ether; yielding crystalline picrates and oxims, substantially as described.

5. The herein described alpha-n-methylpyrrolidylpropan-(-1-)-on having most probably the formula:

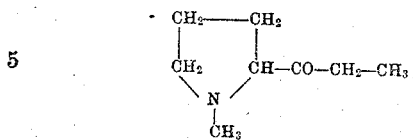

being an oil of a disagreeable basic odor easily soluble in water and in the usual organic solvents; boiling at from 70°-75° C. under a pressure of 12 mm.; its picrate melting at 103° C., substantially as described.

In testimony whereof I have hereunto set my hand in the presence of two subscribing witnesses.

KURT HESS.

Witnesses:
 A. H. SCHRADER,
 M. J. SPALDING.